(12) United States Patent
Bosko

(10) Patent No.: US 6,712,342 B2
(45) Date of Patent: Mar. 30, 2004

(54) HOLLOW FIBER CARBONATION

(75) Inventor: Robert S. Bosko, San Antonio, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 53 days.

(21) Appl. No.: 10/045,239

(22) Filed: Oct. 26, 2001

(65) Prior Publication Data

US 2003/0080443 A1 May 1, 2003

(51) Int. Cl.[7] .................................................. B01F 3/04
(52) U.S. Cl. ...................... 261/127; 261/128; 261/104; 261/DIG. 7; 426/477; 99/323.2
(58) Field of Search ..................... 261/35, 101, 102, 261/104, 105, 107, 127, 128, DIG. 7; 426/474, 477; 99/323.1, 323.2

(56) References Cited

U.S. PATENT DOCUMENTS

| | | | | |
|---|---|---|---|---|
| 3,578,214 A | * | 5/1971 | Iannelli | 261/21 |
| 3,741,552 A | * | 6/1973 | Skoli et al. | 261/DIG. 7 |
| 3,960,066 A | * | 6/1976 | LaRocco et al. | 99/323.2 |
| 4,160,727 A | * | 7/1979 | Harris, Jr. | 210/259 |
| 4,882,097 A | * | 11/1989 | Shannon | 261/DIG. 7 |
| 4,927,567 A | | 5/1990 | Rudick | |
| 5,256,279 A | | 10/1993 | Voznick et al. | |
| 5,565,149 A | | 10/1996 | Page et al. | |
| 5,670,094 A | * | 9/1997 | Sasaki et al. | 261/27 |
| 5,927,099 A | | 7/1999 | Bosko | |
| 6,138,995 A | | 10/2000 | Page | |
| 6,158,721 A | * | 12/2000 | Katou et al. | 261/DIG. 7 |
| 6,355,292 B1 | * | 3/2002 | Cheng et al. | 426/477 |

OTHER PUBLICATIONS

Specification Sheet for Ligui–Cel® Membrane Contactors, Printed From Liqui–Cel. com web site, on Sep. 4, 2001.
Schematic Drawing of Liqui–Cel® Membrane Contactor, Printed From Liqui–Cel.com web site, on Sep. 4, 2001.

* cited by examiner

Primary Examiner—Scott Bushey

(57) ABSTRACT

Methods and apparatus for beverage dispensing are provided with a carbonator (12) that includes a plurality of hydrophobic hollow fibers (32). A pre-carbonation circuit (28) may also be included. A water treatment system (14) may be used to supply water to the carbonator (12) and/or the pre-carbonation circuit (28).

20 Claims, 2 Drawing Sheets

HOLLOW FIBER CARBONATION

TECHNICAL FIELD OF THE INVENTION

This invention relates generally to beverage dispensing, and in particular to methods and apparatus for carbonating beverages.

BACKGROUND OF THE INVENTION

In "post-mix" beverage dispensing, beverage syrups are mixed with plain or carbonated water to form finished beverages. Carbonation has proved to be one of the more difficult areas in post-mix dispensing. For example, carbonation systems are relatively expensive and can present significant maintenance and reliability issues.

Therefore, a need has arisen for a less expensive, high quality, and more reliable carbonation system.

SUMMARY OF THE INVENTION

In accordance with the teachings of the present invention, methods and apparatus for carbonating beverages are provided which substantially eliminate or reduce problems associated with prior art systems.

In a particular embodiment, a beverage dispenser is provided that includes a water supply (that may or may not comprise treated water), a $CO_2$ source, and a carbonator coupled to the water supply and the $CO_2$ source. The carbonator includes at least one hydrophobic hollow fiber proximate to which water is carbonated. Also included is a beverage syrup source, such that beverage syrup and carbonated water are dispensed to form finished drinks. In one particular embodiment, the hydrophobic hollow fiber comprises polypropylene.

In particular embodiments, $CO_2$ is supplied through one or more hollow fibers, and water flows across the outside of one or more of the hollow fibers. In an alternative embodiment, water is supplied through one or more of the hollow fibers.

It is advantageous to include a water treatment system, such that the water supply comprises treated water. It is particularly advantageous for the water treatment system to comprise a reverse osmosis water treatment system. In another embodiment, a reservoir is coupled to a reverse osmosis water treatment system and the carbonator. Plain water circuits may also be included with the various embodiments, such that both carbonated and non-carbonated beverages may be produced.

In one embodiment, a pre-carbonator is coupled to the carbonator to pre-carbonate water before further carbonation in the carbonator. The pre-carbonator may comprise a plurality of hollow fibers.

In particular embodiments, a reservoir may be coupled to the pre-carbonator, or to the carbonator (whether or not a pre-carbonator is used), to hold carbonated water.

Methods of dispensing beverages are provided that comprise supplying water, supplying $CO_2$, carbonating the water with the $CO_2$ proximate to a plurality of hydrophobic hollow fibers, and dispensing carbonated water and beverage syrup to form finished drinks. The methods may also include treating the water, for example through reverse osmosis. Also, the methods may include pre-carbonating the water before carbonating it.

In particular methods, the treated water is stored before carbonating. Also, non-carbonated water may be dispensed, such that both carbonated and non-carbonated beverages may be produced.

Important technical advantages of the present invention include, among other advantages, reducing the cost of dispensers; increasing the efficiency and reliability of carbonation; and increasing beverage quality due to the use of treated water and better carbonation.

BRIEF DESCRIPTION OF THE DRAWINGS

Reference is made in the description to the following briefly described drawings, wherein like reference numerals refer to corresponding elements.

DETAILED DESCRIPTION OF THE INVENTION

Figure 1:
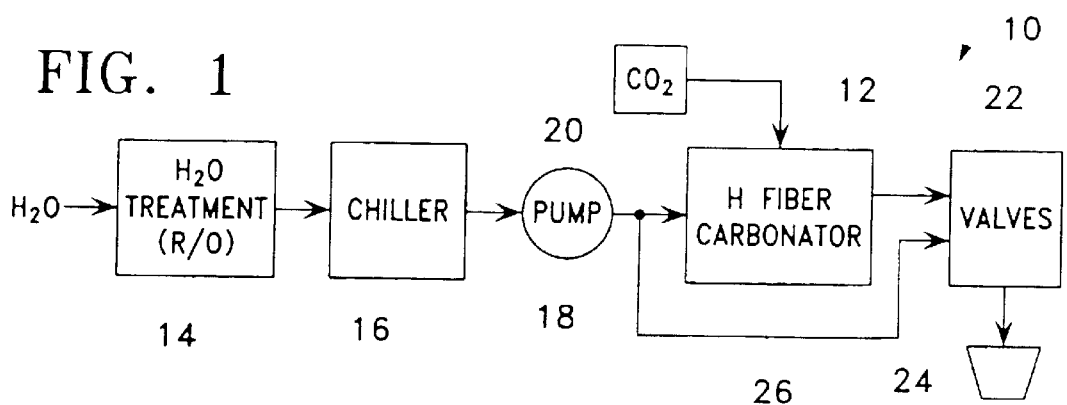
FIG. 1 illustrates an embodiment of a carbonation system with water treatment according to the teachings of the present invention.

FIG. 1 illustrates a dispensing system 10 that includes a hollow fiber carbonator 12 according to the teachings of the present invention. Hollow fiber carbonator 12, which will be discussed in detail in connection with FIGS. 3 and 4, comprises one or more (preferably a bundle of) hollow fibers made of a hydrophobic material, such as polypropylene. Carbonation occurs by molecular gas transfer of $CO_2$ into the water.

Preferably, water is first treated in treatment system 14. However, water may be taken directly from a water supply without treating it in a treatment system. Treatment system 14 can be any water treatment system, but preferably is a reverse osmosis ("R/O") system. Thin film composite membranes ("TFC") or thin film membranes ("TFM") such as those made by the Dow Chemical Company under the trademark Filmtec, may be used as the R/O membrane. However, this is illustrative only, and any R/O device may be used.

Treated water is cooled in the dispenser 10 via chiller unit 16. Chiller unit 16 may be a cold plate, through with the water is circulated and cooled because of contact of the cold plate with ice. As another example, the chilling unit 16 may be an ice/water bath created by a mechanical refrigeration unit, such as a vapor compression system. However, it should be understood that any cooling system may be used for chilling unit 16, including, for example by way of illustration only and not by way of limitation, a system based on Stirling cycle refrigeration.

Chilled water is pumped via pump 18 to the hollow fiber carbonator 12. The $CO_2$ supplied to the carbonator 12 is provided by $CO_2$ source 20 which may comprise a tank of $CO_2$ gas. Carbonated water, also called "soda," is transmitted from the hollow fiber carbonator 12 to dispensing valves 22. Dispensing valves 22, in response to requests for beverages, open to transmit soda to nozzles 24, which facilitate mixing of the water with beverage syrups and/or beverage flavors to form finished drinks. Instead of valves 22, metering pumps or other devices for dispensing may be used, without departing from the intended scope of the present invention.

As shown in FIG. 1, a plain water circuit 26 is also provided, in which plain water is transmitted to the valves 22 around the carbonator 12. In this way, the dispensing unit 10 allows for the dispensing of both carbonated beverages (with soda created through the carbonator 12 and transmitted to the valves 22) and plain water beverages, such as teas or juices (with plain water transmitted to the valves 22 via plain water circuit 26).

With the present invention, significant advances result from the use of hydrophobic hollow fiber carbonator 12. In particular, efficient carbonation occurs at either low pressures or high pressures, because of the use of the hydrophobic material in the hollow fibers of carbonator 12. The ability to carbonate at low pressures can significantly reduce the costs of the dispenser 10. Furthermore, the combination of the hollow fiber carbonator 12 and the water treatment unit 14 provides for extremely efficient carbonation. In particular, the use of R/O treatment creates water that is very efficiently carbonated with the hollow fiber carbonator 12.

Figure 2:
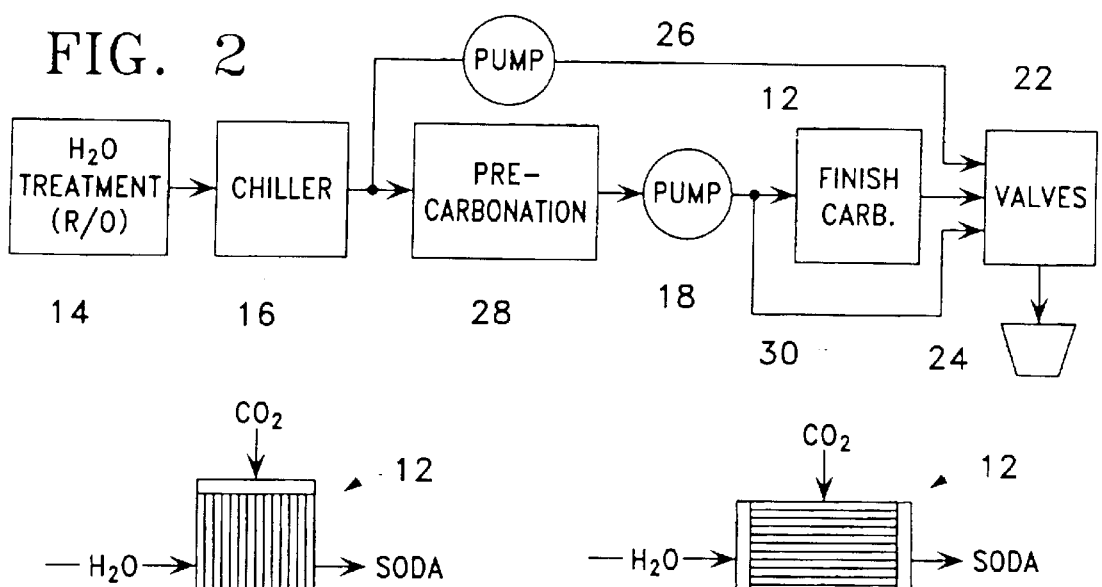
FIG. 2 illustrates an embodiment of a pre-carbonation and finishing carbonation combination according to the teachings of the present invention.

FIG. 2 illustrates another embodiment of the present invention in which a pre-carbonation circuit 28 is provided. Pre-carbonation circuit 28 provides a supply of soda at a carbonation level lower than that required for some or all of the carbonated beverages to be dispensed. For example, if the most highly carbonated beverage includes five volumes of carbonation, then pre-carbonation circuit 28 may provide, as an example, a carbonation level of 2.5 volumes. However, it should be understood that this is an example only, and any carbonation level may be provided by pre-carbonation circuit 28. In the embodiment of FIG. 2, carbonator 12 acts as a finishing carbonation unit, further carbonating water from the pre-carbonation circuit 28.

As is shown in FIG. 2, the plain water circuit 26 runs parallel to the pre-carbonation circuit 28, to provide plain water to the valves 22 for plain water finished beverages. Also shown in FIG. 2 is a lower-carbonation level circuit 30 that runs parallel to carbonator 12. The lower-carbonation level circuit 30 provides soda to the valves 22 at a lower carbonation level than that provided by carbonator 12. Thus, with the system shown in FIG. 2, valves 22 can receive plain water, or soda carbonated at at least two different levels, as provided by circuit 30 or through carbonator 12.

Moreover, different levels of carbonation can be provided by mixing varying amounts of plain water with varying amounts of the soda provided by circuit 30 or carbonator 12 (whether or nor a pre-carbonation circuit is used). As another alternative, the carbonation level from carbonator 12 may be varied by adjusting the carbonation pressure provided by carbonation supply 20. For example, a variable regulator may be provided to adjust the pressure depending on carbonation required.

Figure 3:
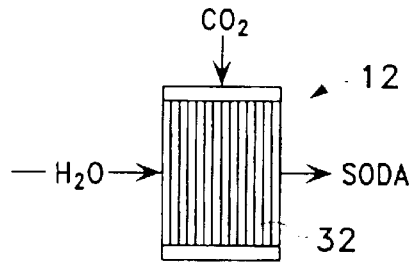
FIG. 3 illustrates an embodiment of a hollow fiber carbonator according to the teachings of the present invention.

FIG. 3 illustrates a particular embodiment of carbonator 12. As shown in FIG. 3, the carbonator 12 preferably includes a bundle of individual hollow fibers 32. $CO_2$ is supplied to these hollow fibers and runs through the hollow core of the fibers 32. Water is supplied between the individual fibers, and can be supplied at any angle to the bundle, including tangentially to the bundle or parallel to the bundle. Carbonation occurs by molecular gas transfer through the hydrophobic fibers.

Figure 4:
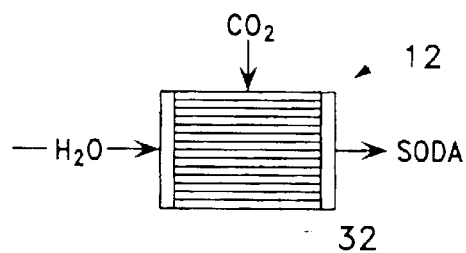
FIG. 4 illustrates another embodiment of a hollow fiber carbonator according to the teachings of the present invention.

FIG. 4 illustrates an alternative configuration of carbonator 12, in which the water is supplied through the cores of the hollow fibers 32, and $CO_2$ is supplied between the individual fibers of the bundle. Thus, in FIG. 4, water flows through the fibers, with $CO_2$ supplied outside of the fibers. Again, carbonation occurs through molecular gas transfer.

Examples of hollow fiber membranes suitable for use with the present invention are provided by Celgard Inc., under the trademark Liqui-Cel®. While a bundle of hollow fibers is preferred, the carbonator may be configured as one or more fibers. For example, but not by way of limitation, one fiber may be used that is wound or laid out back and forth, or in a mesh or net pattern, to create sufficient surface area for the desired level of carbonation.

Figure 5:
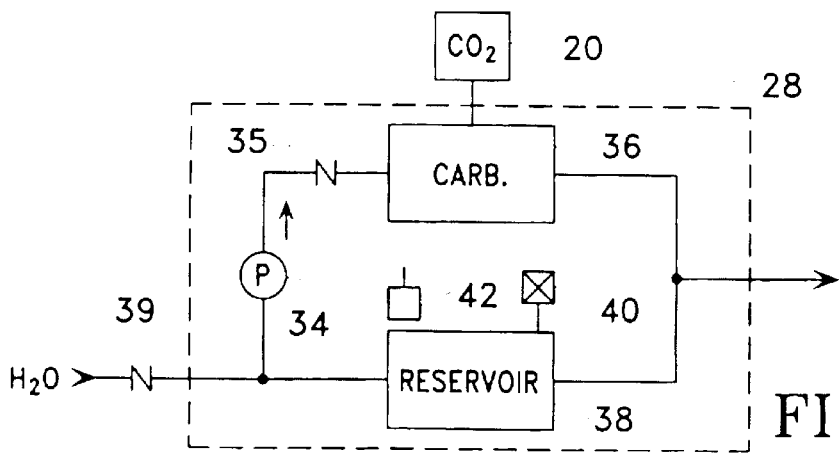
FIG. 5 illustrates one embodiment of a pre-carbonation system according to the teachings of the present invention.

FIG. 5 illustrates a particular embodiment of pre-carbonation circuit 28. As shown in FIG. 5, pre-carbonation circuit 28 includes a pump 34, a hollow fiber carbonator 36 coupled to a $CO_2$ source 20, and a reservoir 38 coupled between the output of carbonator 36 and the input of pump 34. The reservoir 38 is preferably a flexible laminate bag capable of retaining carbonation. A relief valve 40 may be coupled to reservoir 38 to relieve pressures. In operation, water from the chiller unit 16 is provided to the pre-carbonation circuit 28. Pump 34 pumps the cold water through the carbonator 36, which may be configured, for example, as shown in FIG. 3 or FIG. 4. The carbonated water output from the carbonator 36 is stored in the reservoir 38. The pre-carbonation circuit 38 creates a reservoir of pre-carbonated water for dispensing. This reservoir is important in connection with the use of R/O systems, as it allows storage of treated water during lower use periods, thus allowing for smaller R/O systems than would be required if treated R/O water were supplied on demand.

The pre-carbonation circuit 28 operates continuously until the reservoir 38 is full, at which time the pump 34 is shut off. In a particular example, a proximity switch 42 may be used to control the pump 34. When the bag of reservoir 38 is full, it will physically contact the proximity switch, thus resulting in a signal that turns off the pump 34. It should be understood that other sensors may be used to regulate the volume of the reservoir, including floats. Also, other reservoirs, such as permanent tanks, may be used. However, it is preferable to use a bag and an external switch or sensor to minimize contamination of the water. With the pre-carbonation circuit 28 shown in FIG. 5, a reservoir of carbonated water is provided, thus allowing for high volume dispensing with a low volume R/O unit. Therefore, costs are greatly reduced over alternative configurations.

The output of the carbonator 36 and the reservoir 38 may be sent to valves 22 or finishing carbonator 12, or may be sent there through a cooling coil located in proximity to the chilling unit 16, so as to chill the water from the reservoir 38 before dispensing. Check valves 35 and 39 may be provided to prevent backflow (backflow prevention may be included in other embodiments, as well, if desired).

Figure 6:
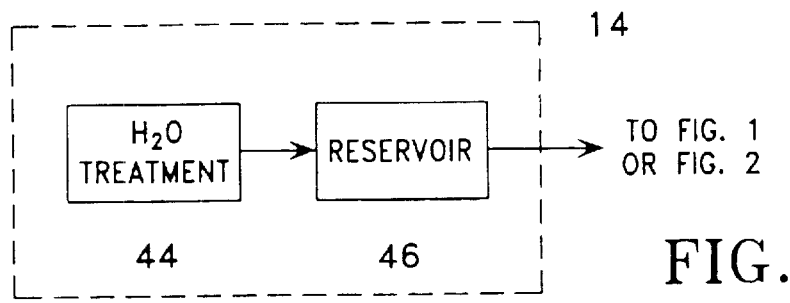
FIG. 6 illustrates one embodiment of a treated water source according to the teachings of the present invention.

FIG. 6 illustrates a particular embodiment of water treatment system 14. As shown in FIG. 6, water treatment system 14 may include a water treatment unit 44, such as an R/O unit as discussed above, and a reservoir 46. The reservoir 46 is preferably a bag with a volume regulation sensor, such as that discussed above in connection with FIG. 5. With the configuration shown in FIG. 6, a reservoir of plain water is provided for supply to the beverage dispenser 10. In a preferred embodiment, the water treatment system 14 is built in as part of the dispensing unit 10; however, all or part of the water treatment system 14 may be separate from the dispenser 10. By using reservoir 46, a relatively small treatment unit, and in particular a small R/O unit, may be used, thus lowering the costs from those that would be expended if an R/O unit were configured to supply water on demand. Also, systems other than or in addition to an R/O unit may be used, including, without limitation, pre-filter carbon filter systems.

In particular embodiments, the water treatment system may comprise some or all of the elements and advantages of those disclosed in pending U.S. patent application Ser. No. 09/912,868 (filed Jul. 25, 2001), Ser. No. 09/773,381 (filed Jan. 31, 2001, now U.S. Pat. No. 6,423,212), and Ser. No. 09/775,116 (filed Feb. 1, 2001), entitled "Self Cleaning Pre-Filter System." "Microbial Resistant Water Purification and Collection System," and "Constant Pressure Filtered Water Delivery System," respectively, all of which are commonly owned by the assignee or inventor of the present application, and which are herein expressly incorporated by reference, in their entirety.

The reservoir 46 may be regulated by a sensor that senses when the reservoir is full, to turn off the water treatment unit 44. The preferred embodiment of reservoir 46 is a flexible plastic laminate bag, with an external sensor for regulating volume. The use of a flexible bag reduces contamination issues and provides other advantages, such as lower costs and easy cleaning, since the flexible bag can be replaced periodically, if necessary. U.S. Pat. Nos. 5,256,279 and 5,927,099, which are herein incorporated by reference in their entirety, disclose particular combinations of water treatment systems with flexible bags that may be used, among others, as particular embodiments of a water treatment system in the present invention. However, any reservoir, such as a permanent tank, and internal or external sensors, may also be used.

Figure 7:
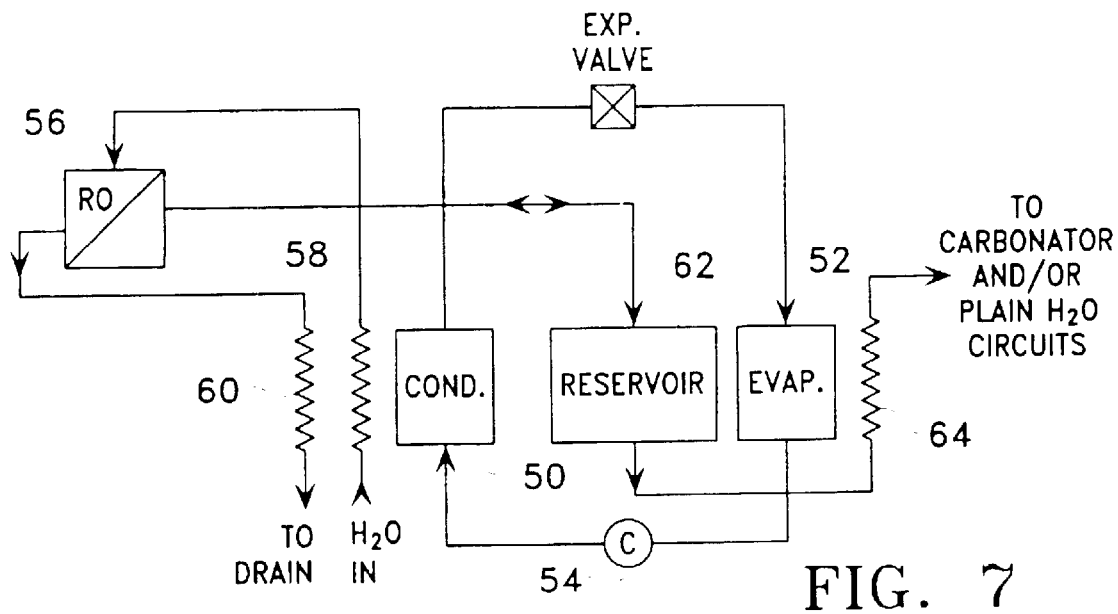
FIG. 7 illustrates a particular embodiment of an integrated source of plain treated water for use with beverage dispensing.

FIG. 7 illustrates a more detailed example of a particular water supply system for beverage dispensing 10. In the particular example of FIG. 7, the chilling unit is a vapor compression refrigeration unit that includes condenser 50 and evaporator 52. A compressor 54 pumps refrigerant from the evaporator 52 to the condenser 50. Water is provided to R/O system 56 from an external water supply, such as a municipal supply. In a particular embodiment, the inlet water is transmitted through a coil 58 located in close proximity to condenser 50. This approach preheats the water to the R/O system 56, improving the efficiency of the R/O unit, and also improving the efficiency of the refrigeration unit by assisting in condensation across condenser 50. Similarly, the reject water from R/O unit 56 may be passed through coil 60 to assist in condensation across condenser 50. However, it should be should be understood that these circuits 58 and 60 are exemplary only, and need not be included. While pre-heating the inlet water assists in R/O treatment efficiency, it then requires further cooling of the water by evaporator 52. Thus, a balance should be made between the most efficient use of energy and water, depending on the demands of the application. In most cases, overall efficiency should be improved by using reject water from the R/O unit 56 to assist in condensation across condenser 50.

Treated water from the R/O unit 56 is stored in reservoir 62, which may be a reservoir such as that discussed above in connection with reservoir 46 of FIG. 6 (water may also flow back for back flushing of the unit 56). In a preferred embodiment, the reservoir 62 is located in proximity to evaporator 52, to cool the water within the reservoir 62. Water to be dispensed for carbonated or plain water drinks is drawn from the reservoir 62 through circuit 64 which is cooled by evaporator 52. The system of FIG. 7 provides the advantages discussed above in connection with FIG. 6, in that a relatively small R/O unit may be used because of the storage reservoir 62. Furthermore, by placing the reservoir 62 in close proximity to the evaporator 52, relatively high quantities of cold water are available.

Although the refrigeration unit shown in FIG. 7 is a vapor compression system, a similar configuration can be used in connection with an ice-cooled cold plate. The evaporator 52 would represent a cold plate, and the reservoir 62 would be located in close proximity to the cold plate. With an ice-cooled cold plate, obviously the condenser and pump shown in FIG. 7 are not needed.

Figure 8:
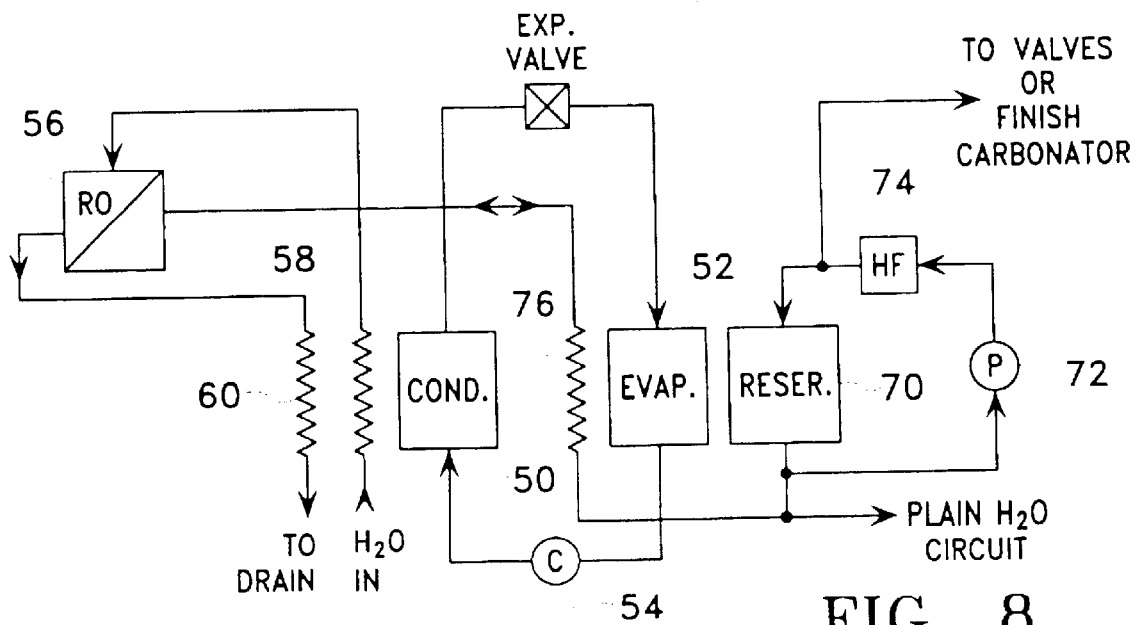
FIG. 8 illustrates another embodiment according to the teachings of the present invention in which a pre-carbonation circuit forms a reservoir for supply of treated water.

FIG. 8 illustrates another embodiment of the present invention in which a reservoir 70 is coupled to a carbonation circuit such as that shown in FIG. 5. With the configuration of FIG. 8, the reservoir provides a source of soda. Reservoir 70 of FIG. 8 is located in close proximity to the evaporator 52, and is coupled to a pump 72 and hollow fiber carbonator 74, similar to the carbonation circuit discussed above in connection with FIG. 5.

As shown in FIG. 8, plain treated water is sent through a cooling coil 76 in proximity to evaporator 52 (which may also represent a cold plate) and either bypasses or supplies the carbonation circuit. The bypass circuit leads to the valves for production of finished beverages. Also, the output of the reservoir 70 and carbonator 74 may be transmitted directly to the valves or to a finishing $CO_2$ carbonator, and may be sent there through a coiling cool that runs in proximity to evaporator 52 (or a cold plate). The volume of water in the reservoirs of both FIGS. 7 and 8 may by controlled, as discussed above, through use of an external proximity switch that shuts off flow to the reservoir when sufficiently full. Other control regimes may also be used.

Although not shown in the figures, an electronic control system is provided for controlling operation of the various embodiments discussed herein. The control system may include a microprocessor or microcontroller, and various input/output ports to effect the control. The control system interfaces with the sensors to control operation of the water treatment units, pumps, and any other electronically controlled elements (such as, without limitation, variable regulators). Furthermore, the control system interfaces with a customer interface for turning on valves to dispense the desired beverages, and for dispensing ice, if ice dispensing is included.

The particular descriptions provided are illustrative examples, and features and advantages of each example can be interchanged with, or added to the features and advantages in the other embodiments and examples herein. For example, the embodiments discussed in connection with pre-carbonation may be used alone without a need for a finishing carbonation stage—i.e., the pre-carbonator is the carbonator.

And, in general, although the present invention has been described in detail, it should be understood that various changes, alterations, substitutions, additions and modifications can be made without departing from the intended scope of the invention, as defined in the following claims.

What is claimed is:

1. A beverage dispenser, comprising:
   a water supply;
   a reverse osmosis water treatment system coupled to said water supply, said reverse osmosis water treatment system comprising a flexible bag reservoir;
   a $CO_2$ source;
   a carbonator coupled to said reservoir and said $CO_2$ source, said carbonator including at least one hydrophobic hollow fiber proximate to which water is carbonated;
   a beverage syrup source; and
   a customer interface enabling the dispensing of beverage syrup from said beverage syrup source and carbonated water generated by said carbonator to form finished drinks.

2. The dispenser of claim 1, wherein $CO_2$ is supplied through said hollow fiber.

3. The dispenser of claim 2, wherein water flows across the outside of said hollow fiber.

4. The dispenser of claim 1, wherein water is supplied through said hollow fiber.

5. The dispenser of claim 1, and further comprising a chiller, said flexible bag reservoir proximate said chiller.

6. The dispenser of claim 1, wherein said hydrophobic hollow fiber comprises polypropylene.

7. The dispenser of claim 1, and further comprising a plain water circuit, such that both carbonated and non-carbonated beverages may be produced.

8. The dispenser of claim 1, and further comprising a pre-carbonator coupled to said carbonator, said pre-carbonator carbonating water before further carbonation in said carbonator.

9. The dispenser of claim 8, wherein said pre-carbonator comprises at least one hollow fiber.

10. The dispenser of claim 8, and further comprising a pre-carbonation reservoir coupled to said pre-carbonator, said pre-carbonation reservoir holding carbonated water.

11. The dispenser of claim 1, and further comprising a carbonation reservoir coupled to said carbonator, said carbonation reservoir holding carbonated water.

12. The dispenser of claim 11, and further comprising a plain water circuit, such that both carbonated and non-carbonated beverages may be produced.

13. A method of dispensing beverages, comprising:
    supplying water;
    treating the water through reverse osmosis;
    storing the treated water in a flexible bag;
    supplying $CO_2$;
    carbonating the water from the flexible bag with the $CO_2$ proximate to at least one hydrophobic hollow fiber; and
    dispensing carbonated water and beverage syrup to form finished drinks.

14. The method of claim 13, and further comprising chilling the water in the flexible bag.

15. The method of claim 13, and further comprising dispensing non-carbonated water, such that both carbonated and non-carbonated beverages may be produced.

16. The method of claim 13, and further comprising pre-carbonating the water before carbonating the water.

17. A beverage dispenser, comprising:
    a water supply;
    a $CO_2$ source;
    a carbonator coupled to said water supply and said $CO_2$ source, said carbonator including at least one hydrophobic hollow fiber through which water is supplied; and
    a beverage syrup source, such that beverage syrup and carbonated water are dispensed to form finished drinks.

18. The dispenser of claim 17, and further comprising a water treatment system, such that said water supply comprises treated water.

19. The dispenser of claim 18, wherein said water treatment system comprises a reverse osmosis water treatment system.

20. The dispenser of claim 17, and further comprising a plain water circuit, such that both carbonated and non-carbonated beverages may be dispensed.

* * * * *